Patented June 15, 1948

2,443,246

UNITED STATES PATENT OFFICE 2,443,246

PREPARATION OF CERTAIN DIARYLACETONITRILES

August H. Homeyer, Webster Groves, and Janet S. Splitter, St. Louis, Mo., assignors to Mallinckrodt Chemical Works, St. Louis, Mo., a corporation of Missouri No Drawing. Application December 9, 1946, Serial No. 715,134

3 Claims. (Cl. 260—465)

This invention relates to the preparation of nitriles and more particularly to the preparation of diaromatic acetonitriles.

Among the objects of this invention are the provision of an improved method for the preparation of diaromatic acetonitriles; the provision of a method of the type indicated which may be easily carried out with available materials; the provision of a method of the type referred to which affords high yields of the desired nitrile, and the provision of a method of the type indicated which may be utilized to prepare nitriles at relatively low cost. Other objects will be in part apparent and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

According to the present invention it has been found that, according to the equation

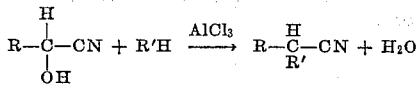

nitriles such as diphenylacetonitrile may be conveniently prepared by the reaction of a mandelonitrile and an aromatic hydrocarbon under the influence of anhydrous aluminum chloride. As an illustration, the preparation of diphenylacetonitrile is shown in the following equation:

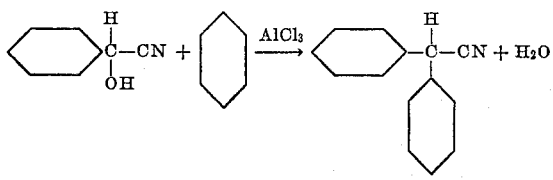

The reaction takes place without difficulty at convenient operating temperatures to form a high yield of diphenylacetonitrile.

The present invention is applicable not only to the preparation of diphenylacetonitrile but to the preparation of homologues thereof by the use of homologues of the reaction materials referred to above. For example, when toluene is substituted for benzene, the corresponding phenyltolylacetonitrile is obtained. Similarly, homologues of mandelonitrile may be substituted for mandelonitrile itself in the reaction referred to, to form nitrile products which are homologues of diphenylacetonitrile.

The following examples illustrated the invention:

EXAMPLE 1

Diphenylacetonitrile

In a 12-liter, four-necked flask, equipped with a condenser, stirrer, thermometer, and addition funnel, were placed anhydrous benzene (4.5 liters) and technical anhydrous aluminum chloride (7 pounds). Operations were conducted in a well ventilated hood since hydrogen chloride and hydrogen cyanide were evolved. The flask and contents were cooled by means of an ice bath. Mandelonitrile (1330 g.) was added gradually during a period of 3½ hours to the stirred reaction mixture which was maintained at a temperature of 10–20° C. After the addition of the mandelonitrile, the reaction mixture was heated slowly to a temperature of 75° C. and maintained at this temperature for one hour. After cooling the reaction mixture, water was added cautiously through the addition funnel. Cooling was continued to control the exothermic reaction while a total of 3 liters of water was added. Then excess benzene was removed by steam distillation. The product was present as an oil which solidified on cooling and was filtered from the aqueous part and washed with water. The crude product (1680 g.—87% yield) was dissolved in hot methanol (5 l.) and decolorized with activated carbon. The alcoholic solution was chilled and the product which crystallized was filtered. A second recrystallization from methanol (1.6 l.) yielded 1464 g. (76% yield) of dry purified diphenylacetonitrile, melting point 73–75° C.

EXAMPLE 2

Phenyltolylacetonitrile

A three-liter, four-necked flask, equipped with a condenser, stirrer, thermometer, and addition funnel, was set up in a well ventilated hood. Anhydrous toluene (1 liter) and anhydrous aluminum chloride (1¼ pounds) were placed in the flask which was cooled by means of an ice bath. Mandelonitrile (266 g.) was added gradually during a period of 4 hours to the stirred reaction mixture which was maintained at a temperature of 10–20° C. After the addition of the mandelonitrile, the reaction mixture was allowed to stand at room temperature for 18 hours. Water (600 ml.) was then added cautiously through the addition funnel while the flask and contents were cooled by means of an ice bath. Then the excess toluene was removed by steam distillation. The crude product solidified on cooling and was filtered from the aqueous part and washed with water. The crude product (250 g.—60% yield) was dissolved in hot methanol (400 ml.) and decolorized with activated carbon. The alcoholic solution was chilled and the product which crystallized was filtered and dried. A second recrystallization from methanol yielded 203 g. (49% yield) of phenyl-p-tolylacetonitrile, melting point 60–62° C.

The solvent was removed from the combined mother liquors and the oily residue then distilled under reduced pressure, yielding 116 g. (28% yield) of isomeric phenyltolylacetonitriles, B. P. 120–125°/3 mm.

As indicated above, analogous compounds containing an alkyl substituent attached to the ring may be substituted for mandelonitrile and for benzene and toluene in the foregoing examples. The products obtained will, of course, contain this alkyl group.

In general, under the influence of anhydrous aluminum chloride, aromatic hydroxyacetonitriles will react with those aromatic compounds which have the same order of aromaticity as benzene, provided they are not destroyed or altered by anhydrous aluminum chloride under the conditions of the preparation. Aromaticity is a well recognized chemical characteristic of organic compounds. Thus, in addition to benzene and its homologs, many other compounds, among them, thiophene, pyridine, pyrrole and furan, are said to have aromatic properties, i. e., to resemble aromatic compounds, taking part in characteristic chemical reactions.

The benzene or toluene that is employed in the foregoing examples serves not only as a reactant but part of it also serves as a reaction medium. If desired, however, a non-reactive solvent may be used for the latter purpose and the proportion of benzene or toluene employed may be correspondingly reduced. In such instances, equimolar proportions of the aromatic compounds, such as benzene or toluene, and the mandelonitrile are preferred in order to obtain substantially complete utilization of the reactants.

It is preferred that the initial stages be carried out at relatively low temperatures in order to keep the reaction under control. In order to expedite the reaction, it may be completed at elevated temperatures, as for example, under reflux, although in some instances this is not advantageous.

The diphenylacetonitrile or other nitrile products may be recovered from the reaction mixture by the addition of aqueous media other than water if desired.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:

1. The method of making a compound selected from the group consisting of diphenylacetonitrile and alkyl substituted diphenylacetonitriles which comprises mixing a compound selected from the group consisting of mandelonitrile and alkyl substituted mandelonitriles with a compound selected from a group consisting of benzene and alkyl benzenes, and aluminum chloride.

2. The method of making diphenylacetronitrile which comprises mixing mandelonitrile, benzene, and aluminum chloride.

3. The method of making phenyltolylacetonitrile which comprises mixing mandelonitrile with toluene and aluminum chloride.

AUGUST H. HOMEYER.
JANET S. SPLITTER.

REFERENCES CITED

The following references are of record in the file of this patent:

Berkman et al., "Catalysis" (Reinhold), page 953 (1940).